Dec. 10, 1929.       C. F. JENKINS       1,739,312
SPOT ILLUMINATION OF LENS CELLS
Filed Oct. 31, 1927
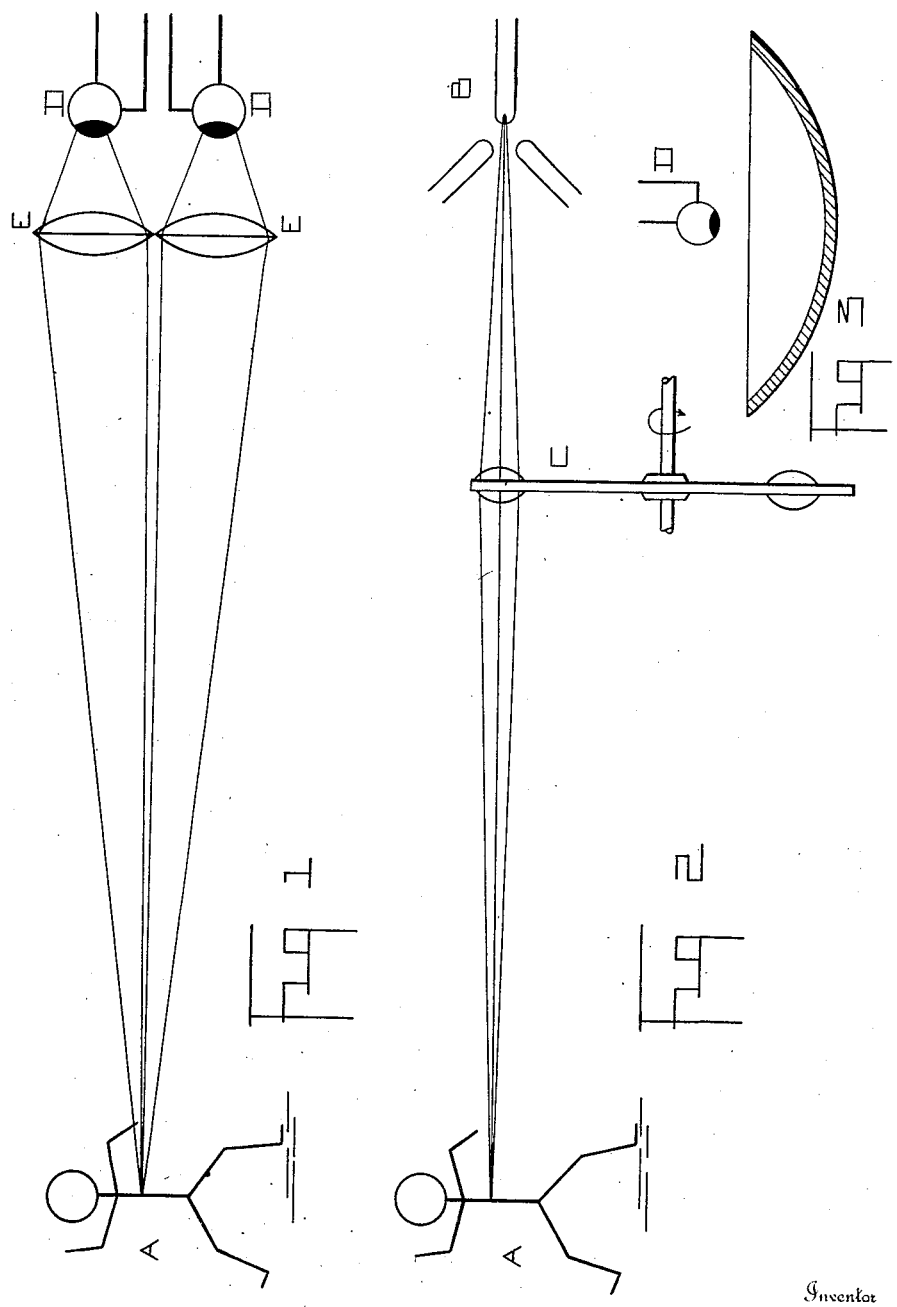

Patented Dec. 10, 1929

1,739,312

UNITED STATES PATENT OFFICE

CHARLES FRANCIS JENKINS, OF WASHINGTON, DISTRICT OF COLUMBIA, ASSIGNOR TO JENKINS LABORATORIES, OF WASHINGTON, DISTRICT OF COLUMBIA, A CORPORATION OF THE DISTRICT OF COLUMBIA

SPOT ILLUMINATION OF LENS CELLS

Application filed October 31, 1927. Serial No. 230,069.

This invention relates to the transmission of vision by radio, and has for its principal object means for impressing on the light-sensitive cell the greatest possible amount of light reflected from the subject.

The lighting scheme heretofore most generally employed (since 1884) consists in lighting the whole subject uniformly and sweeping the subject with a light-cell having an elementary area only exposed thereto at any one moment.

A transposed method consists in illuminating elementary areas of the subject and exposing the whole subject to the light-cell, a method disclosed as early as 1908, in a British patent of that year.

For certain special subjects this latter has advantages over the first-named method, though it would not seem possible of universal application as the art is known today.

It is to this transposed method that the invention of this application applies, the object being to make it operable with light-sensitive cells readily available.

Light sensitive cells generally available today are of rather small size so that no great area thereof can be exposed to light from an elementary area of the subject scanned. Therefore, the light reflected from each elementary area is often too weak to excite the light-cell to an output current value large enough to start the most sensitive amplifiers known at this time.

The object of the invention of this application is to largely increase the amount of light which can be passed through the window of available cells.

It is accomplished by mounting a relatively very large lens in front of the cell-window in such a way that a great amount of light can be passed into the cell.

The potassium cell (the only cell available fast enough for radio-vision and television service) soon reaches a saturation point, and reacts to increased cell-area-exposed better than to increased light intensity; so the lens-concentrated light is not focused to a point on the cell area, but is spread out to cover a much greater area by locating the cell short of or beyond the conjugate focal point.

With this and other objects in view the invention consists of the novel combination of parts hereinafter described, illustrated in the drawings, and particularly pointed out in the claims.

In the schematic drawings herewith, Figure 1 shows the method of light-pickup; Figure 2 the spot method of subject illumination; and Figure 3 a mirror instead of a lens pickup.

In the figures, A is a subject in motion, to be scanned; B is a light-source focused on the subject by the lenses of disc C.

Although there are but two lenses shown located at different radial distance from the axis of the disc, there is usually a multiplicity of like lenses arranged in a spiral as shown in my Patent No. 1,679,086, granted July 31, 1928.

The subject is, therefore, scanned in a plurality of adjacent lines of point illumination.

The points of scanning illumination are picked up by the lenses, each one of which concentrates its light into its respective cell, though not at the conjugate focal point of the lens.

An adjustment can, therefore, be made which causes the scanning spot to fully cover the cell area.

I am aware that lenses in front of light-cells have been proposed heretofore, but never in a manner to attain the superior results attained by the combination herein disclosed and claimed.

Lenses are shown as light collectors, but obviously other optical equivalents could be employed, for example, the mirror of Figure 3; and a multiplicity of such elements may be used limited only by the exigencies of the assembly.

What I claim, is:—

1. In apparatus of the class described, means for illuminating a subject in successive elementary areas, a lens for collecting the light reflected from said areas in the form of a widely diffused beam, and a light-sensitive cell to receive said collected light, said cell located outside the focal plane of the lens and the area of the light collecting lens being a plurality of times the area of the light sensitive cell, whereby the ordinary small light sensitive cell may be employed.

2. In apparatus of the class described, means for illuminating the subject in successive elementary areas, a light-sensitive cell to receive the light reflected from the subject in the form of a widely diffused beam, and optical means of a plurality of times greater light-collecting area than the cell alone for concentrating the light into the cell whereby the ordinary small light sensitive cell may be employed.

3. In apparatus of the class described, means for illuminating a subject in successive elementary areas, a light-sensitive cell to receive the light reflected from the subject in the form of a widely diffused beam, and means having a plurality of times greater light-collecting area than the cell alone for concentrating the light into said cell whereby the ordinary small light sensitive cell may be employed.

4. In a television system the method which comprises projecting a small spot of light upon the subject or object, rapidly moving said spot over said subject or object, and collecting the light reflected from said subject or object in the form of a widely diffused beam and projecting the collected light upon a light sensitive device.

5. The method according to claim 4 in which the cross-section of the beam as projected upon the light sensitive device is many times smaller than the cross section of the reflected beam at the point of collection.

In testimony whereof I have affixed my signature.

CHARLES FRANCIS JENKINS.